(12) United States Patent
Wise

(10) Patent No.: US 7,607,386 B2
(45) Date of Patent: Oct. 27, 2009

(54) SYSTEM FOR SIMULTANEOUSLY BREWING AND DISPENSING MULTIPLE BEVERAGES OR ANY VARIATION THEREOF FROM A SINGLE UNITARY STRUCTURE

(76) Inventor: Lorielle Wise, 500 W. Cypress Creek Rd., Suite 500, Fort Lauderdale, FL (US) 33339

( * ) Notice: Subject to any disclaimer, the term of this patent is extended or adjusted under 35 U.S.C. 154(b) by 677 days.

(21) Appl. No.: 11/318,224

(22) Filed: Dec. 23, 2005

(65) Prior Publication Data

US 2006/0137533 A1 Jun. 29, 2006

Related U.S. Application Data

(60) Provisional application No. 60/639,249, filed on Dec. 27, 2004.

(51) Int. Cl.
*A47J 31/00* (2006.01)
*B67D 31/00* (2006.01)

(52) U.S. Cl. .................. 99/291; 99/323.3; 222/144.5; 222/466; 222/475.1; 220/525

(58) Field of Classification Search .................. 99/291, 99/323.3, 306, 307; 222/144.5, 475.1, 466, 222/482, 485, 566; 220/592.16, 592.18, 220/592.22, 525, 526, 772
See application file for complete search history.

(56) References Cited

U.S. PATENT DOCUMENTS

| | | | | |
|---|---|---|---|---|
| 230,724 A | * | 8/1880 | Trump | 222/466 |
| 1,484,889 A | * | 2/1924 | Kaye | 222/144 |
| 1,896,976 A | * | 2/1933 | Schifferdecker | 220/253 |
| 3,767,087 A | * | 10/1973 | Shannon | 222/144.5 |
| 4,651,900 A | | 3/1987 | Horvath et al. | |
| 4,703,871 A | | 11/1987 | Broker | |
| 4,721,835 A | * | 1/1988 | Welker | 219/689 |
| 4,802,406 A | | 2/1989 | Bouldin | |
| 4,901,630 A | | 2/1990 | Hall | |
| 4,955,503 A | * | 9/1990 | Propes | 220/526 |
| 5,335,589 A | * | 8/1994 | Yerves et al. | 99/295 |
| 5,890,627 A | * | 4/1999 | Storey | 222/129 |
| 5,970,848 A | | 10/1999 | Pelech et al. | |
| 6,497,344 B1 | * | 12/2002 | Dial | 222/144.5 |
| 6,755,328 B1 | * | 6/2004 | Franco | 222/465.1 |
| 6,820,767 B2 | * | 11/2004 | Nicholas | 222/144.5 |
| 2006/0249544 A1 | * | 11/2006 | Woog | 222/466 |

* cited by examiner

*Primary Examiner*—Reginald L Alexander
(74) *Attorney, Agent, or Firm*—Melvin K. Silverman; Yi Li

(57) ABSTRACT

A system for simultaneously brewing and dispensing multiple beverages from a single substantially unitary structure includes a rigid, thermally conductive substantially cylindrically dispensing container having internally fluid discreet compartments each, in horizontal cross-section, defining a polar segment of the cross-section of the container, each of the compartments including pouring spouts at a corresponding mouth of the container, and handles each corresponding to a spout of the structure. The system also includes a circular planar cover selectably securable and rotatable upon or within the mouth of the container. The cover includes a polar opening sufficient in area and geometry to permit flow of a beverage from a selected on of the compartments when a corresponding handle is engaged.

8 Claims, 6 Drawing Sheets

SYSTEM FOR SIMULTANEOUSLY BREWING AND DISPENSING MULTIPLE BEVERAGES OR ANY VARIATION THEREOF FROM A SINGLE UNITARY STRUCTURE

REFERENCE TO RELATED APPLICATION

This application is a Utility Application conversion of pending Provisional Application No. 60/639,249, filed Dec. 27, 2004. Priority thereof is claimed under 35 U.S.C. 119(e) and said application is incorporated by reference herewith.

BACKGROUND OF THE INVENTION

A Field of Invention:

The invention relates to a beverage brewing device and, more particularly, an adaptation of a coffee maker to allow for the brewing and dispensing of multiple beverages or any variation thereof from a single structure.

B. Description of the Prior Art

Coffee makers are known in the art for providing convenient appliances specifically adapted for brewing coffee. Most coffee makers include a water reservoir adapted with a heating element, a filter basket adapted for receiving a filter filled with coffee, and a coffee pot disposed below the filter basket. Conventional coffee makers however are limited to brewing one beverage, e.g., regular coffee, at a time. It has been found, however, that some consumers of hot beverages are fond of a variety of flavors, brands, and beverages. As such, the prior art reveals attempts to provide coffee makers capable of brewing and/or serving different types or flavors of beverages in a single system.

For example, U.S. Pat. No. 4,651,900, issued to Horvath et al., discloses a dual compartment serving pot having a pair of pot halves with substantially flat inner walls abutting each other when said halves are joined to a single serving pot having a pair of compartments.

U.S. Pat. No. 4,703,871 to Broker discloses a portable two-liquid dispenser for dispensing one of two liquids from a single vessel having a first and second horizontally disposed compartments separated by a liquid-impermeable barrier, a neck secured to a mounting handle, a valve assembly including first and second valve elements rotatably mounted in the neck for swinging between open and blocking relationship with the compartments and a valve seat in snap-fit relationship with the valve assembly.

Other art also reveals references directed to simultaneous brewing of two beverages, including U.S. Pat. No. 4,802,406 to Bouldin, for an improved coffee brewing apparatus that provides a grounds basket having a divider separating the basket into two side-by-side compartments. Each of the compartments has a brewed coffee outlet in the bottom thereof for passage of the brewed coffee downwardly therethrough and a diverter plate associated with the basket for diverting hot water from the coffee making apparatus uniformly to each side of the basket.

U.S. Pat. No. 4,901,630, to Hall discloses a beverage brewing apparatus having a water containing lid which divides a flow of heated water into two measured portions. The lid enables collection of heated water from various sources including an electric drip coffee maker, and is removably supported by a brewing container having two inner chambers.

U.S. Pat. No. 5,335,589 issued to Yerves, Jr. et al. discloses a multiple beverage dispenser wherein a container is divided into two separate compartments for holding two different types of beverages therein. The dispenser can be used in conjunction with a dual system electronic coffee maker, to receive any combination of brewed coffee.

U.S. Pat. No. 5,970,848, issued to Pelech et al., discloses a new dual reservoir coffee machine for making two different types of coffee in two separate pots. A coffee filter attachment couples with a water dispensing portion of the dual system coffee maker, and a pair of semi-cylindrical pots are positioned on the lower burner portion of the dual system coffee maker. Each of the pots has a cover with an opening therethrough. The openings align with the coffee filter attachment. Each of the pots have a handle extending outwardly therefrom.

The above art provides devices which are limited in operation and employ complex and specialized components. This art fails to teach or suggest an apparatus suitable for use with a conventional coffee maker for converting the coffee maker into a machine capable of simultaneous brewing of multiple types/flavors of hot beverages. Accordingly, there exists a need for such an improvement in the art of beverage brewing devices. There also exists a need for a multiple beverage brewing system that is safely usable on vessels such as airplanes and ships where some movement of the environment is a likely occurrence.

The within invention overcomes the above set forth disadvantages and limitations in the art by providing a system which adapts an otherwise conventional coffee maker into an apparatus capable of simultaneous brewing of multiple types and/or flavors of hot beverages and dispensing the same through a plurality of specially configured compartments of a serving container.

SUMMARY OF THE INVENTION

The instant invention teaches a system for simultaneously brewing and dispensing multiple beverages or any variation thereof from a single substantially unitary structure. The system comprises a rigid, thermally conductive substantially cylindrical dispensing container having a plurality of internal mutually fluid discreet compartments each, in horizontal cross-section, defining a solid polar segment of said cross-section of said container, each of said compartments including a plurality of pouring spouts at a mouth of said container, and a plurality of handles, each depending integrally outwardly from an external wall of the container and in a vertical plane also passing through a vertical center of a corresponding spout. The system also includes a substantially circular planar cover selectably securable to a rotatable on or within a mouth of said container, said cover including a polar segment opening sufficient in area and geometry to permit flow of a beverage from a selected one of said compartments when a corresponding handle is engaged by a user/ Thereafter, said polar opening is routed on or within the periphery of said mouth to a selected one Compartment, and said container is tipped in a direction of the spout of the selected compartment. Thereby a beverage of interest within said compartment may be poured by a user of the system.

The above set forth structure is a part of a larger system which includes a brewing structure having a fresh water reservoir, including means for heating water therein, and a siphon for delivery of heated water from said reservoir to a highest level of said brewing structure. Also included is a brewing basket having a plurality of internal mutually fluid-tight compartments therein corresponding in number and axial position to each partition of said plurality of partitions of said dispensing container. Said basket also includes filtration means selectably attachable upon a mouth of said basket. Said filtration means includes an outlet of said siphon.

In another embodiment, the beverage container portion of interest may be externally selected, and only a single handle is necessary.

It is accordingly an object of the invention to provide an improved and cost-effective beverage brewing apparatus.

It is another object to provide a filter basket and serving container suitable for use with an otherwise conventional coffee maker.

It is a yet further object of the invention to provide a multiple beverage brewing and dispensing system having enhanced stability and ease of use relative to systems known in the art having related objectives.

The above and yet other objects and advantages of the present invention will become apparent from the hereinafter set forth Brief Description of the Drawings, Detailed Description of the Invention and Claims appended herewith.

DETAILED DESCRIPTION OF THE INVENTION

Figure 1:
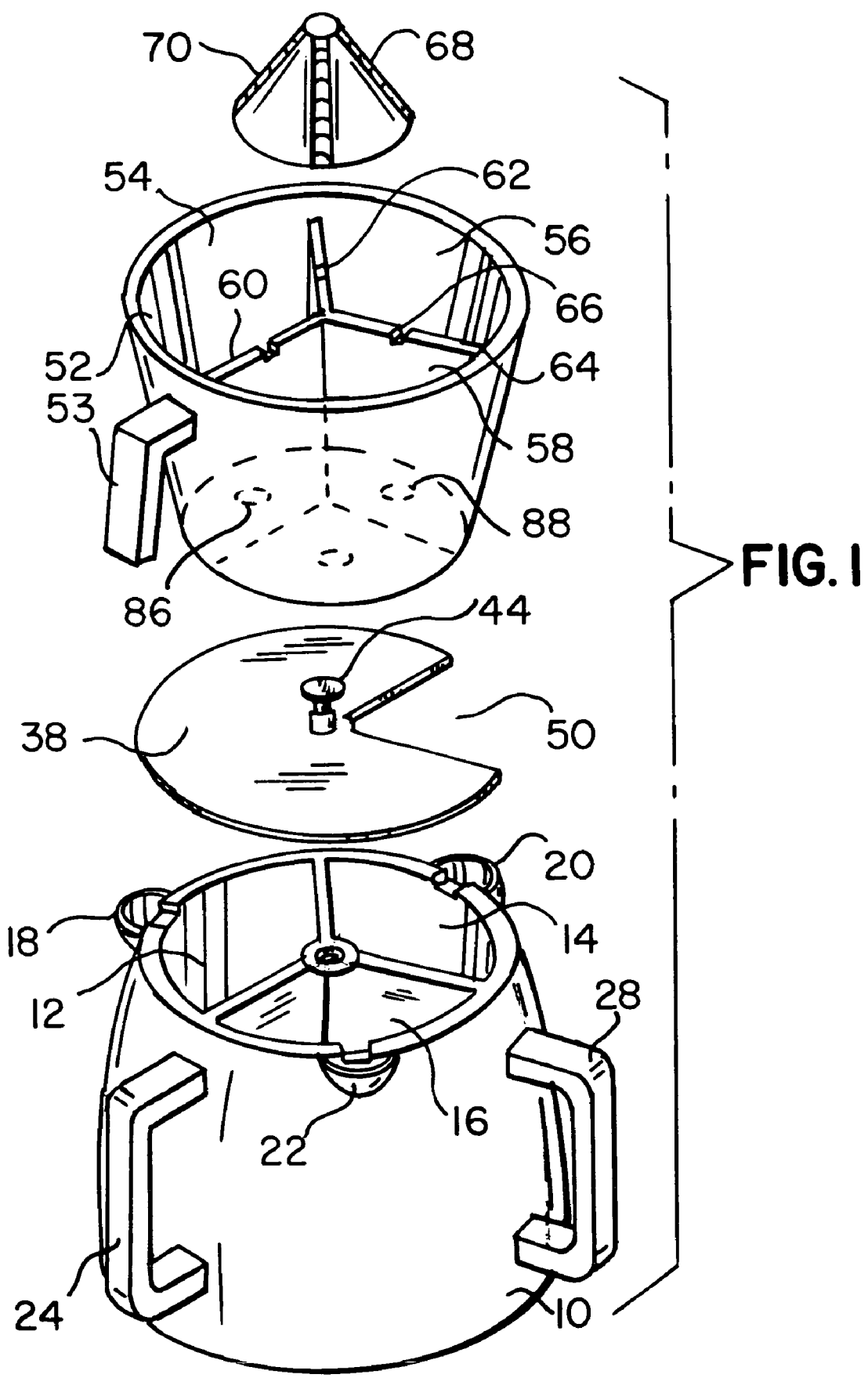
FIG. 1 is an exploded view of a first embodiment of the inventive system.
Figure 2:
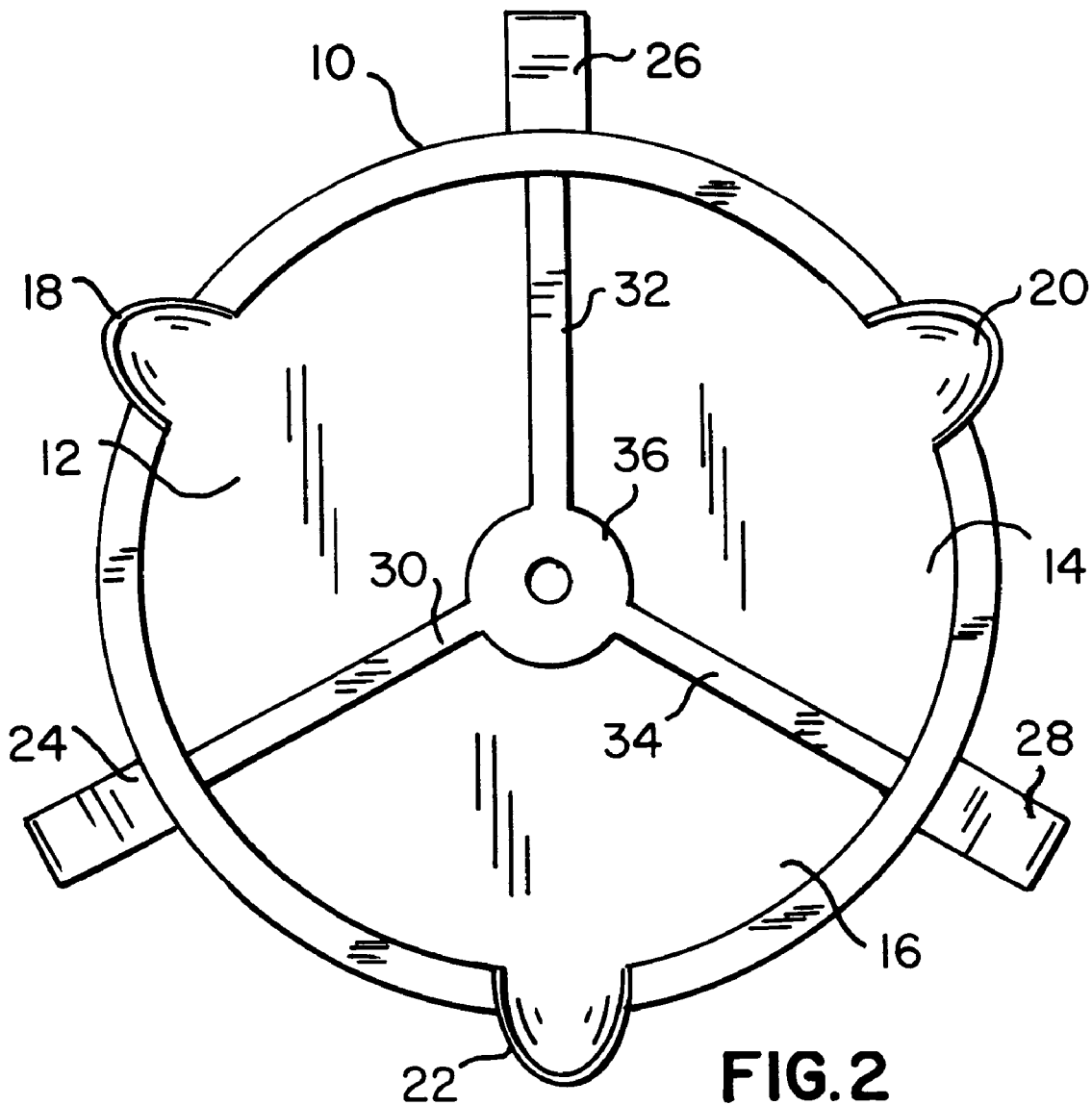
FIG. 2 is a top view of the dispensing container of the embodiment of the system shown in FIG. 1.

With reference to the exploded view of FIG. 1, there is shown a first embodiment of the present inventive system for simultaneously brewing and dispensing multiple beverages from a single substantially unitary structure. More particularly, in FIGS. 1 and 2 are shown a rigid, thermally conductive substantially cylindrical container 10 having a plurality of internal mutually fluid-discrete compartments 12, 14 and 16, each of which is provided with a corresponding spout 18, 20 and 22. Dispensing container 10 further includes a plurality of external handles 24, 26 and 28 which are preferably disposed within a radial plane which is co-planar with partitions 30, 32 and 34 and depend from an axis 36 of container 10. Said spouts are also positioned in alignment with the respective radial planes of partitions 30, 32 and 34, i.e., spout 20 is in radial alignment with handle 24 and partition 30; handle 26 and partition 32 are in alignment with spout 22; and handle 28 and partition 34 are in alignment with spout 18. This provides for an optimum balance of the dispensing container when pouring or dispensing therefrom occurs.

As an alternative to the thermally conductive substantially cylindrical container 10 having a plurality of internal mutually fluid-discreet compartments 12, 14 and 16, three separate disposable containers or cups may be utilized.

Figure 4:
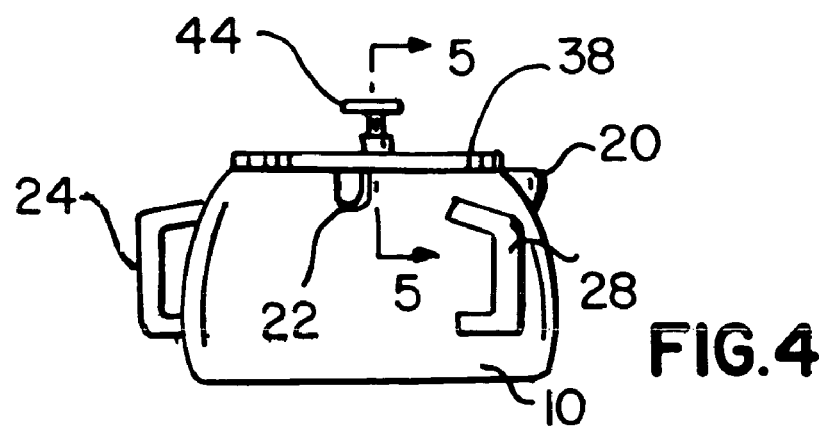
FIG. 4 is a side elevational assembly view of the dispensing container and planar cover thereof.
Figure 5:
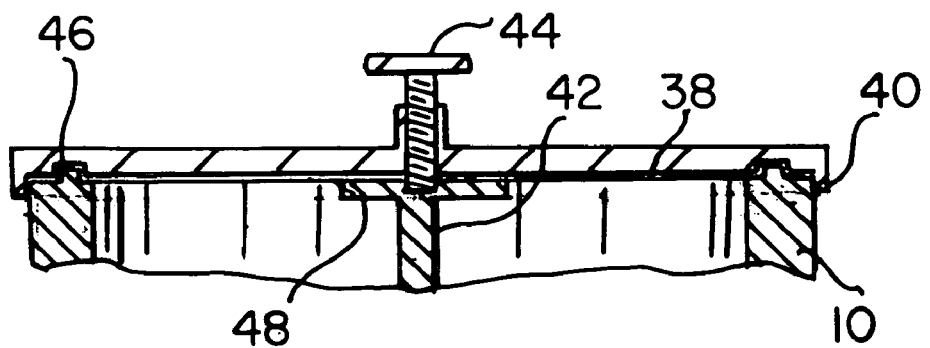
FIG. 5 is vertical diametric cross-sectional view taken through Line 5-5 of FIG. 4.

Positioned above container 10 in the exploded view of FIG. 1 is a substantially circular planar cover 38 which is selectable securable and rotatable within or upon mouth 40 (see FIG. 5) of container 10. This may be accomplished in a number of ways including the provision of an axial handle 44 having a stop 48 such that cover 38 may be selectably rotated within a circumferential male-female structure 46, as may be seen in FIG. 5. Accordingly, in such embodiment, cover 38 is secured between stop 48 and axial handle 44 which is mounted upon axle 42. Cover 38 may then be selectably rotated, such that a polar segment opening 50, having an opening sufficient in area and geometry to permit flow of a beverage from a selected one of said partitions may be rotated over the selected compartment 12, 14, or 16. Various state-of-the-art materials can assure a sufficient seal between said circumferential structure 46 and the underside a periphery of said cover 38. An assembly view of said cover and container is shown in FIG. 4. To operate the container 10, a user will engage the handle 44, rotate cover 38 such that opening 50 is positioned over the compartment of interest. Thereupon, the container is simply tipped in the direction of the spout which is associated with said partition, thus enabling the beverage of interest to be poured by the user.

Figure 3:
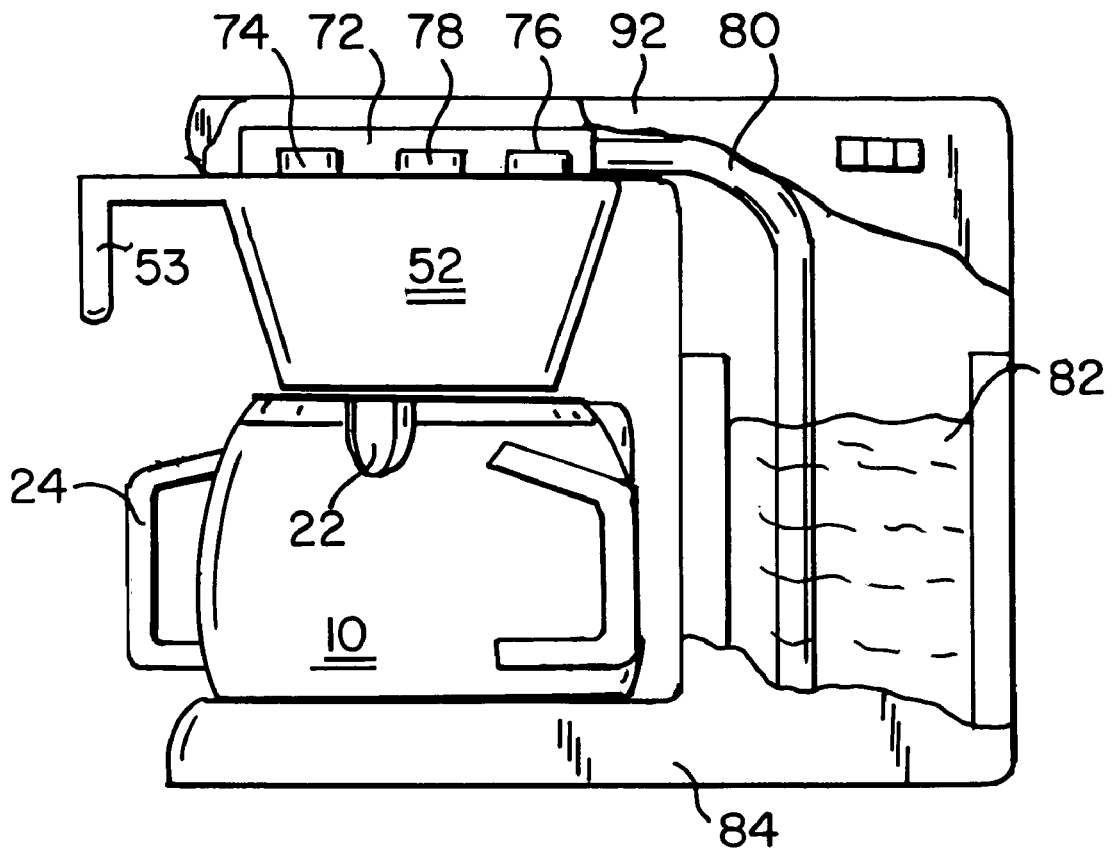
FIG. 3 is an assembly view of embodiment of FIG. 1 and also showing the water reservoir associated with the system.

A larger brewing structure adapted to accommodate the kettle or container 10, above described is shown in FIG. 3 wherein it may be seen brewing basket 52 (see also FIG. 1) and handle 53, including its constituent compartments, namely, compartments 54, 56 and 58 which, in terms of polar position correspond to respective partitions 12, 14 and 16 of said container 10. Said partitions within brewing basket 52 are defined by separators 60, 62 and 64. Provided thereon are notches 66 on which may be disposed a filter 68 which is provided with a plurality of water flow directors 70, the object of which is to assure that water provided to partitions the various compartments are equally distributed therebetween.

Figure 6:
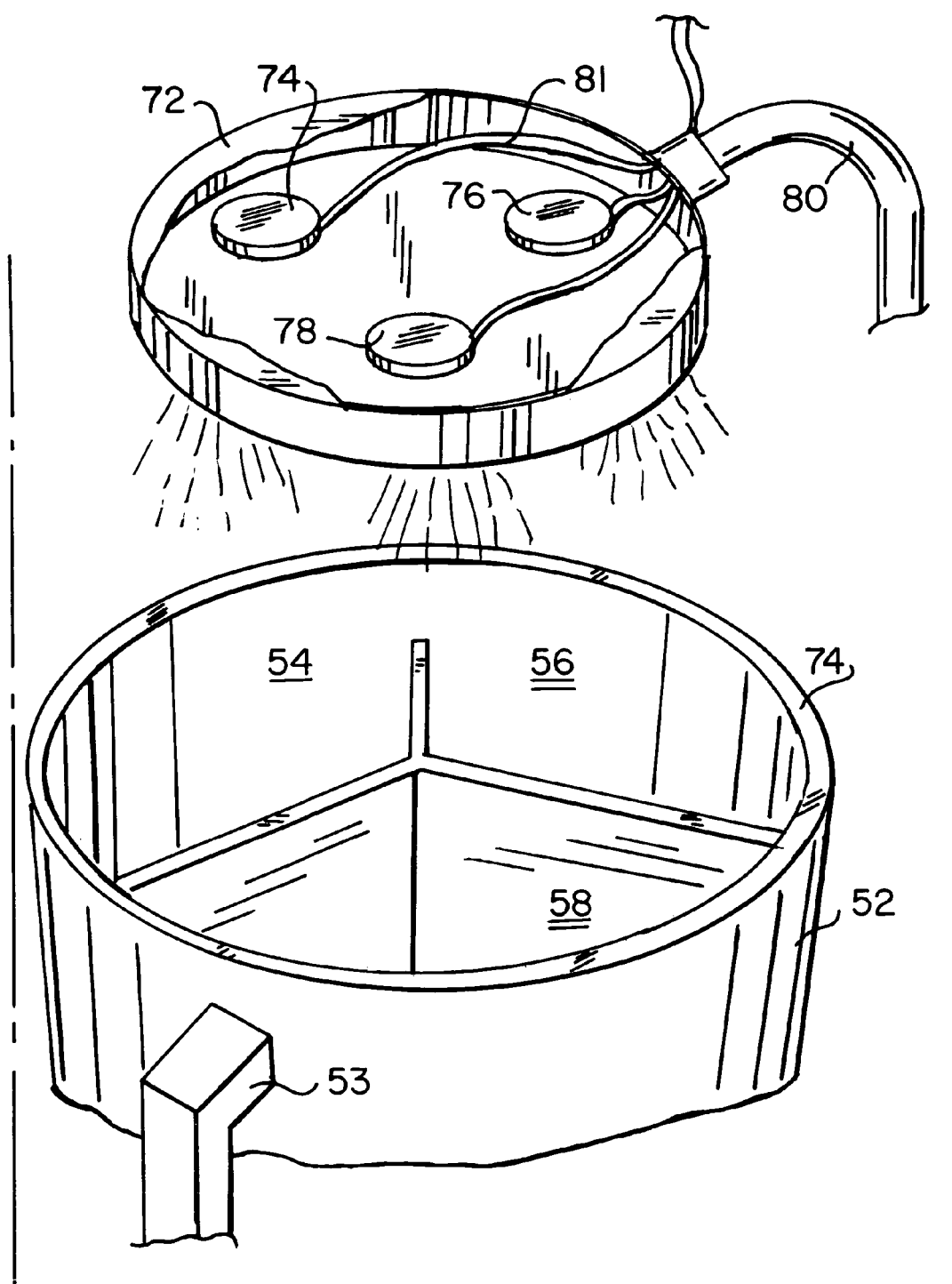
FIG. 6 is an exploded view of a water input filtration means which may be used in association with the present system.
Figure 7:
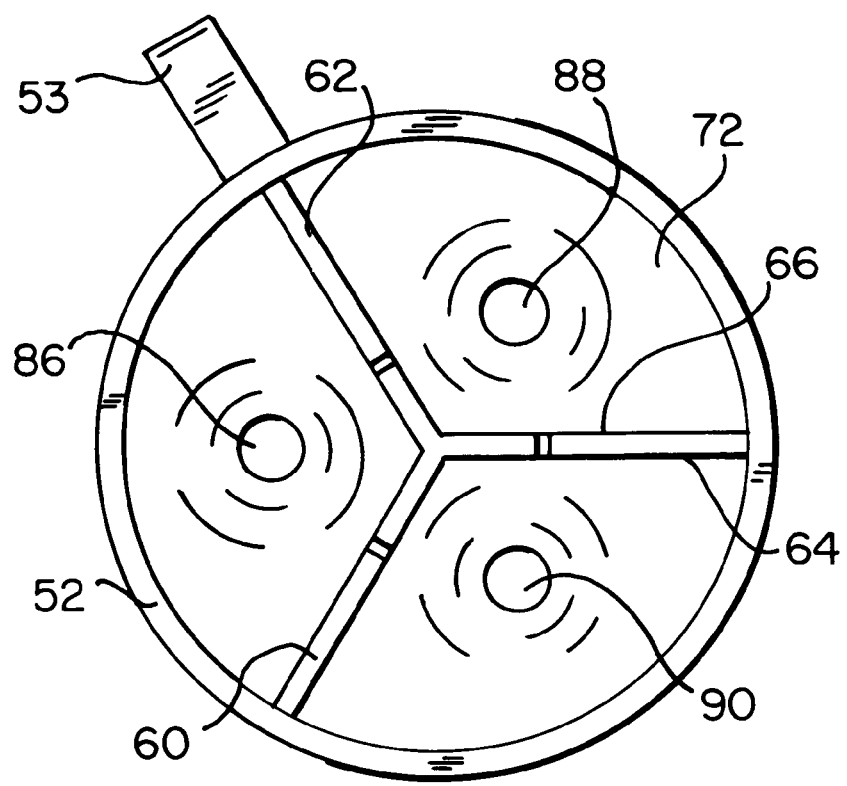
FIG. 7 is a top view of the brewing basket of FIG. 6.

A number of strategies alterative to the use of filter 68 may be employed, one of which is set forth below. For example, in FIGS. 3, 6 and 7 is shown a wafer-like basket filter 72 which includes outlets 74, 76 and 78 from siphon 80 which draws its water supply from a water reservoir 82 (see FIG. 3). The structure 84 shown in FIG. 3, is generally conventional of coffer making machines today, including heating means such that water is heated to a boil before it is siphoned through a filter means of some type and provided to brewing basket 52, from which brewed coffee is able to drip through apertures 86, 88 and 90 of basket 52 (see FIG. 7) to said container compartments 12, 14, and 16. It thus should be appreciated that FIGS. 3, 6 and 7 show a brewing structure 84 which includes said fresh water reservoir 82 including heating means (not shown) for said water therein, as well as siphon 80 for the delivery of heated water from said reservoir to a highest level 92 (see FIG. 3) of the brewing structure. This structure includes said brewing basket 52 having said internal mutually fluid tight compartments 54, 56 and 58. corresponding in number and position to each compartment 12, 14 and 16 of the dispensing container 10, described above. The structure further includes filtration means which may take the form of either the conical section 68 positioned within notches 66 of the partitions of the brewing basket or may take the form of said wafer-like cylindrical section 72 proportioned for placement upon mouth 94 of the basket 52. Outlets 81 of said siphon 80 are discrete conduits, each directed to one of said regions 74, 76 and 78 of wafer-like cylindrical section 72 that as above noted, are situated above or within mouth 94 of brewing basket 52 (see FIG. 6).

Figure 9:
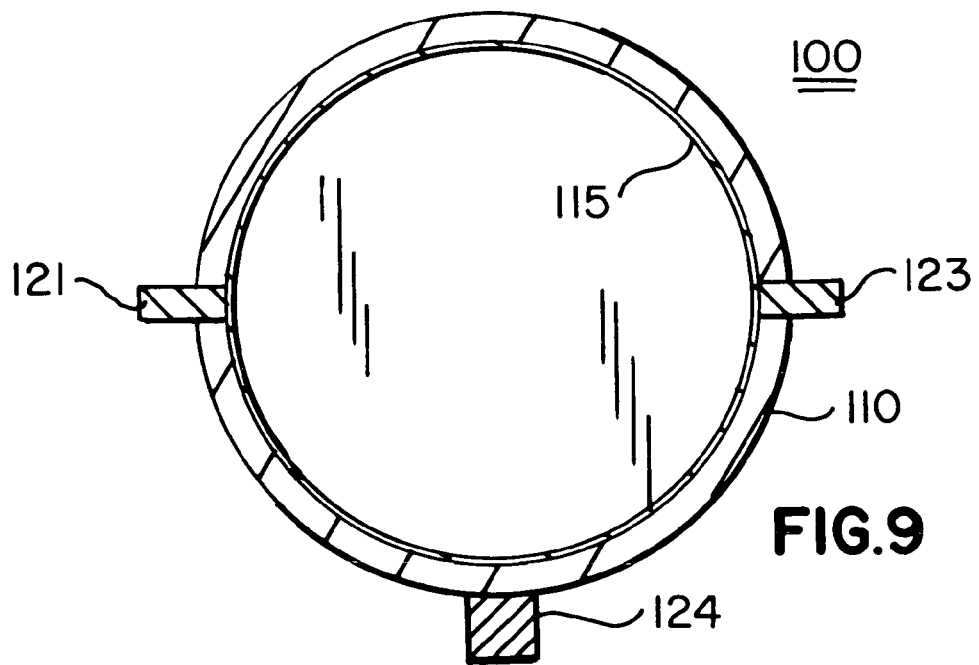
FIG. 9 is a radial cross-sectional view of FIG. 8.
Figure 8:
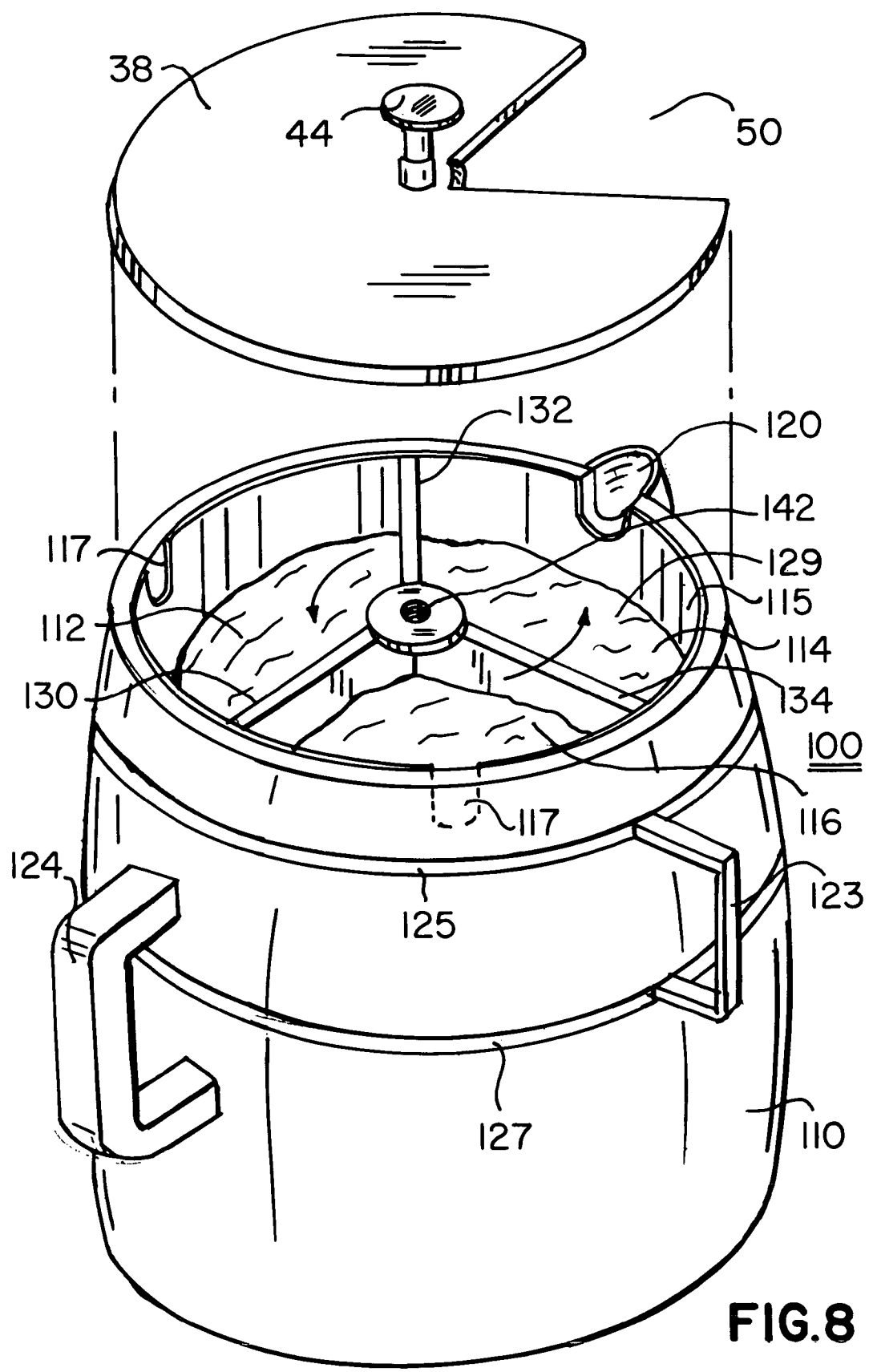
FIG. 8 is a view of a second embodiment of the dispensing container including an associated internal beverage-holding assembly, in which a cover thereof is shown in exploded view.

In FIGS. 8 and 9 is shown a further embodiment 100 of the present invention which differs from the embodiment of FIGS. 1-4 in the structure of the container or dispensing portion thereof. More particularly, as may be noted in FIGS. 8-9, there is provided a housing 110 and a single handle 124 and therewithin a container 115 which is circumferentially rotatable, as by bearing means, relative to an axial axle 142. Container 115 is characterized by compartments 112, 114 and 116 which are formed by separators 130, 132 and 134. An outer periphery of container 115 is provided with notches 117 which are complemental to spout 120, such that upon rotation of container 115, to a desired compartment of a particular beverage to be dispensed, into alignment with spout 120, beverage 129 therein may be readily poured from the compartment to and through spout 120.

Rotation of container 115 is accomplished by handles 121 and 123 (see FIG. 9) which are integrally attached to container 115 and extend radially outwardly therefrom through circumferential channels 125 and 127 as are shown in FIG. 8.

Accordingly, in this embodiment, only a single handle 124 and single spout 120 is necessary, thereby improving the adaptability of the system for use within a conventional brewing structure of the type of FIG. 3.

While there has been shown and described the preferred embodiment of the instant invention it is to be appreciated that the invention may be embodied otherwise than is herein specifically shown and described and that, within said embodiment, certain changes may be made in the form without departing from the underlying ideas or principles of this invention as set forth in the Claims appended herewith.

I claim:

1. A system for simultaneously brewing and dispensing multiple beverages from a single unitary structure, the system comprising:
   (a) a rigid, thermally conductive substantially cylindrical dispensing container having a plurality of internal mutually fluid discrete compartments, each, in horizontal cross-section, defining a polar segment of said cross-section of said container, a plurality of pouring spouts at a mouth of said container, each located within one of said compartments, and a plurality of handles extending from an external wall of said container, each of said handles positioned opposing, and in radial alignment with, one of said pouring spouts, respectively; and
   (b) a substantially circular planar cover selectably securable to and rotatable within said mouth of said container, said cover including a polar opening sufficient in area to permit flow of a beverage from a selected one of said compartments when said polar opening is positioned above said selected compartment,
   whereby a beverage of interest within said compartment may thereby be poured by a user of the system, when said cover is rotated to have said polar opening positioned above said selected compartment, one of said handles is engaged, and said container is tipped in a direction of one of said pouring spouts in said selected compartment, opposing said one of said handles.

2. The system as recited in claim 1, further comprising:
   (c) a brewing structure including a fresh water reservoir, including means for heating water therein, and a siphon for delivery of heated water from said reservoir to a highest level of said brewing structure;
   (d) a brewing basket having a plurality of internal mutually fluid-tight partitions therein corresponding in number and axial position to each compartment of said plurality of compartments of said dispensing container; and
   (e) filtration means selectably attachable upon a mouth of said brewing basket, said means including an outlet of said siphon.

3. The system as recited in claim 2, in which said filtration means comprises:
   a structure having a conical section having water-flow directors thereon, said conical section proportioned for insertion upon separators that define said compartments within said basket.

4. The system as recited in claim 2, in which said filtration means comprises:
   a wafer-like cylindrical section proportioned for placement upon said mouth of said basket; and
   said outlets of said siphon including a plurality of discreet conduits, each directed to regions of said filtration means situated above respective compartments of said basket.

5. A system for brewing and dispensing multiple beverages from a single structure, the system comprising:
   (a) a rigid, thermally conductive substantially cylindrical housing having therein a container axially rotatable relative to said housing, said container having a plurality of internal mutually fluid discrete compartments, each, in horizontal cross-section, defining a polar segment of a cross-section of said container, said housing having a single pouring spout, and a single handle depending integrally outwardly from an external wall, of said housing, said handle in a vertical plane passing through a vertical center of said spout;
   (b) handles attached to said container, extending therefrom through circumferential channels of said housing to outside of said housing for rotation of said container relative to said housing; and
   (c) a substantially circular planar cover selectably securable to, and rotatable within, said mouth of said housing, said cover including an opening sufficient in area and geometry to permit flow of a beverage from a selected one of said compartments when said cover is rotated to have said opening positioned above said selected compartment;
   whereby a beverage of interest within said selected compartment may thereby be poured by a user of the system when said container is rotated using the handles attached to said container relative to said housing to align said selected compartment with said pouring spout of said housing, said cover is rotated to have said opening positioned above said selected compartment, and said housing is tipped in a direction of said pouring spout.

6. The system as recited in claim 5, further comprising:
   (d) a brewing structure including a fresh water reservoir, including means for heating water therein, and a siphon for delivery of heated water from said reservoir to a highest level of said brewing structure;
   (e) a brewing basket having a plurality of internal mutually fluid-tight compartments therein corresponding in number and axial position to each compartment of said plurality of compartments of said container in said housing; and
   (f) filtration means selectably attachable upon a mouth of said brewing basket, said means including an outlet of said siphon.

7. The system as recited in claim 6, in which said filtration means comprises:
   a structure having a conical section having water-flow directors thereon, said conical section proportioned for insertion upon separators that define said compartments within said basket.

8. The system as recited in claim 6, in which said filtration means comprises:
   a wafer-like cylindrical section proportioned for placement upon said mouth of said basket; and
   said outlets of said siphon including a plurality of discreet conduits, each directed to regions of said filtration means situated above respective compartments of said basket.

* * * * *